US012275859B2

(12) United States Patent
Shiota

(10) Patent No.: US 12,275,859 B2
(45) Date of Patent: Apr. 15, 2025

(54) FLUORINE-CONTAINING ETHER COMPOSITION, COATING SOLUTION, AND ARTICLE AND PRODUCTION METHOD THEREFOR

(71) Applicant: AGC Inc., Tokyo (JP)

(72) Inventor: Hidefumi Shiota, Tokyo (JP)

(73) Assignee: AGC Inc., Tokyo (JP)

( * ) Notice: Subject to any disclaimer, the term of this patent is extended or adjusted under 35 U.S.C. 154(b) by 877 days.

(21) Appl. No.: 17/443,032

(22) Filed: Jul. 20, 2021

(65) Prior Publication Data

US 2021/0348025 A1    Nov. 11, 2021

Related U.S. Application Data

(63) Continuation of application No. PCT/JP2020/004643, filed on Feb. 6, 2020.

(30) Foreign Application Priority Data

Feb. 13, 2019  (JP) ................................. 2019-023333

(51) Int. Cl.
| | |
|---|---|
| *C09D 183/12* | (2006.01) |
| *C07F 7/18* | (2006.01) |
| *C08G 77/46* | (2006.01) |
| *C08L 71/00* | (2006.01) |
| *C09D 5/00* | (2006.01) |
| *C09D 5/16* | (2006.01) |
| *C09D 171/00* | (2006.01) |
| *C09D 183/08* | (2006.01) |

(52) U.S. Cl.
CPC .......... *C09D 183/12* (2013.01); *C07F 7/1804* (2013.01); *C08G 77/46* (2013.01); *C08L 71/00* (2013.01); *C09D 5/00* (2013.01); *C09D 5/1637* (2013.01); *C09D 171/00* (2013.01); *C09D 183/08* (2013.01)

(58) Field of Classification Search
CPC .... C09D 171/00; C09D 183/08; C09D 5/165; C09D 5/1637
See application file for complete search history.

(56) References Cited

U.S. PATENT DOCUMENTS

| 6,200,684 B1 * | 3/2001 | Yamaguchi ........ G02B 27/0006 556/419 |
| 6,528,672 B2 | 3/2003 | Yamaguchi et al. |
| 2002/0071959 A1 | 6/2002 | Yamaguchi et al. |
| 2008/0299399 A1 | 12/2008 | Yamaguchi et al. |
| 2011/0098402 A1 | 4/2011 | Yamane et al. |
| 2013/0108876 A1 | 5/2013 | Komori et al. |
| 2022/0010064 A1 * | 1/2022 | Yamashita ....... C08G 65/33306 |

FOREIGN PATENT DOCUMENTS

| JP | 2000-327772 A | 11/2000 | |
| JP | 2002-121277 A | 4/2002 | |
| TW | 200922969 A * | 6/2009 | ............ C07F 7/1804 |
| WO | WO 2009/008380 A1 | 1/2009 | |
| WO | WO-2013146112 A1 * | 10/2013 | ............ C03C 17/30 |
| WO | WO-2014163057 A1 * | 10/2014 | ............... B05D 5/08 |
| WO | WO 2018/043166 A1 | 3/2018 | |

OTHER PUBLICATIONS

Machine translation of TW-200922969-A (2009, 26 pages).*
Machine translation of WO-2014163057-A1 (2014, 16 pages).*
Machine translation of WO-2013146112-A1 (2013, 25 pages).*
U.S. Appl. No. 17/443,038, filed Jul. 20, 2021, Keigo Matsuura, et al.
International Search Report issued Apr. 14, 2020 in PCT/JP2020/004643 filed on Feb. 6, 2020, 3 pages.
Third Party Observation issued Jun. 11, 2021 in PCT/JP2020/004643 filed on Feb. 6, 2020, 9 pages.

* cited by examiner

*Primary Examiner* — Brieann R Johnston
(74) *Attorney, Agent, or Firm* — Oblon, McClelland, Maier & Neustadt, L.L.P.

(57) ABSTRACT

The object of the present invention is to provide a fluorinated ether composition with which a surface layer capable of imparting excellent water/oil repellency to the surface of a substrate and being excellent in abrasion resistance and weather resistance of the water/oil repellency, can be formed, and a coating liquid containing the fluorinated ether composition. The present invention further provides an article having a surface layer formed of the fluorinated ether composition, and a method for producing it.

A fluorinated ether composition containing a specific fluorinated ether compound (1) having a poly(oxyfluoroalkylene) chain and having two silyl groups each having a hydrolyzable group bonded, at one terminal of the chain via an amide bond, and a specific fluorinated ether compound (2) having a poly(oxyfluoroalkylene) chain and having two silyl groups having a hydrolyzable group bonded, at both terminals of the chain via an amid bond.

14 Claims, No Drawings

FLUORINE-CONTAINING ETHER COMPOSITION, COATING SOLUTION, AND ARTICLE AND PRODUCTION METHOD THEREFOR

TECHNICAL FIELD

The present invention relates to a fluorinated ether composition, a coating liquid, an article and a method for producing it.

BACKGROUND ART

A fluorinated compound, which has high lubricity, water/oil repellency, etc., is suitably used for a surface treatment agent. By the surface treatment agent, water/oil repellency is imparted to the surface of a substrate, whereby stain removability improves and stain on the substrate surface will easily be wiped off. Among fluorinated compounds, a fluorinated ether compound having a poly(oxyperfluoroalkylene) chain having an ether bond (—O—) in a perfluoroalkylene chain is a compound which is excellent in flexibility and which is excellent particularly in oil and fat stain removability.

It has been known to use, as a surface treatment agent such as an antifouling agent or a water/oil repellent, a composition containing a fluorinated ether compound having a poly(oxyperfluoroalkylene) chain and having two silyl groups each having a hydrolyzable group bonded at one terminal of the chain via an amide bond (Patent Documents 1 and 2).

Further, it has been known to use, in the same manner as above, as a surface treatment agent such as an antifouling agent or a water/oil repellent, a composition containing a fluorinated ether compound having a poly(oxyperfluoroalkylene) chain and having two silyl groups each having a hydrolyzable group bonded at both terminals of the chain via an amide bond (Patent Document 3).

PRIOR ART DOCUMENTS

Patent Documents

Patent Document 1: JP-A-2000-327772
Patent document 2: WO2018/043166
Patent Document 3: JP-A-2002-121277

DISCLOSURE OF INVENTION

Technical Problem

However, the present inventor has found that the surface layer obtained from the composition as described in Patent Document 1 or 2 is inferior in the weather resistance of the water/oil repellency. The present inventor has further found that the surface layer obtained from the composition as described in Patent Document 3 may sometimes be not suitable for applications which require water/oil repellency at a higher level.

The object of the present invention is to provide a fluorinated ether composition with which a surface layer capable of imparting excellent water/oil repellency to the surface of a substrate and being excellent in abrasion resistance and weather resistance of the water/oil repellency can be formed, and a coating liquid containing the fluorinated ether composition. Another object of the present invention is to provide an article having a surface layer formed of the fluorinated ether composition, and a method for producing it.

Solution to Problem

The present invention provides a fluorinated ether composition, a coating liquid, an article, and a method for producing the article, having the following constructions.

[1] A fluorinated ether composition comprising compound (1) represented by the following formula (1) and compound (2) represented by the following formula (2):

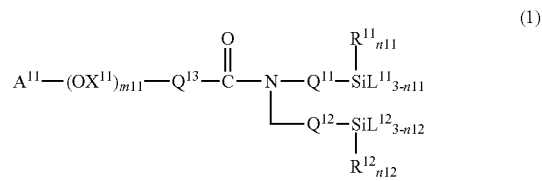

wherein $A^{11}$ is a perfluoroalkyl group,
$X^{11}$ is a fluoroalkylene group having at least one fluorine atom,
m11 is an integer of from 2 to 200,
$Q^{11}$ and $Q^{12}$ are each independently a bivalent linking group,
$R^{11}$ and $R^{12}$ are each independently a monovalent hydrocarbon group,
$L^{11}$ and $L^{12}$ are each independently a hydrolyzable group or a hydroxy group,
n11 and n12 are each independently an integer of from 0 to 2, and
$Q^{13}$ is a single bond or a bivalent linking group;

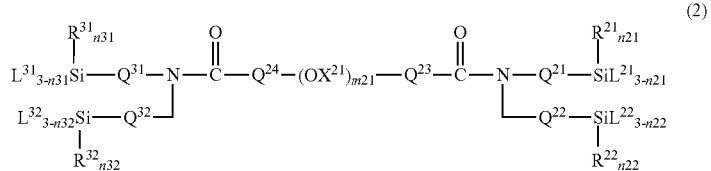

wherein $X^{21}$ is a fluoroalkylene group having at least one fluorine atom,
m21 is an integer of from 2 to 200,
$Q^{21}$, $Q^{22}$, $Q^{31}$, $Q^{32}$ and $Q^{24}$ are each independently a bivalent linking group,
$R^{21}$, $R^{22}$, $R^{31}$ and $R^{32}$ are each independently a monovalent hydrocarbon group,
$L^{21}$, $L^{22}$, $L^{31}$ and $L^{32}$ are each independently a hydrolyzable group or a hydroxy group, n21, n22, n31 and n32 are each independently an integer of from 0 to 2, and $Q^{23}$ is a single bond or a bivalent linking group.

[2] The fluorinated ether composition according to [1], which contains the compound (2) in an amount of from 1.0 to 90.0 mol % to the total amount of the compound (1) and the compound (2).

[3] The fluorinated ether composition according to [1] or [2], wherein $X^{11}$ is a $C_{1-6}$ perfluoroalkylene group, and $Q^{13}$ is a single bond.

[4] The fluorinated ether composition according to any one of [1] to [3], wherein $—Si(R^{11})_{n11}L^{11}_{3-n11}$ and $—Si(R^{12})_{n12}L^{12}_{3-n12}$ are the same group.

[5] The fluorinated ether composition according to any one of [1] to [4], wherein $X^{21}$ is a $C_{1-6}$ perfluoroalkylene group, $Q^{23}$ is a single bond, and $Q^{24}$ is a $C_{1-6}$ perfluoroalkylene group.

[6] The fluorinated ether composition according to any one of [1] to [5], wherein $—Si(R^{21})_{n21}L^{21}_{3-n21}$, $—Si(R^{22})_{n22}L^{22}_{3-n22}$, $—Si(R^{31})_{n31}L^{31}_{3-n31}$ and $—Si(R^{32})_{n32}L^{32}_{3-n32}$ are the same group.

[7] The fluorinated ether composition according to any one of [1] to [6], which further contains a fluorinated oil.

[8] The fluorinated ether composition according to [7], wherein the fluorinated oil is a perfluoropolyether oil.

[9] The fluorinated ether composition according to [7] or [8], which contains the fluorinated oil in an amount of from 0.1 to 50 mass % to the total amount of the compound (1), the compound (2) and the fluorinated oil.

[10] A coating liquid comprising the fluorinated ether composition as defined in any one of [1] to [9], and a liquid medium.

[11] An article comprising a substrate and a surface layer formed of the fluorinated ether composition as defined in any one of [1] to [9] on the surface of the substrate.

[12] The article according to [11], which has the surface layer on a surface of a member constituting a plane of a touch panel to be touched by fingers.

[13] A method for producing an article, which comprises treating a surface of a substrate by dry coating method using the fluorinated ether composition as defined in any one of [1] to [9] to form a surface layer formed of the fluorinated ether composition on the surface of the substrate.

[14] A method for producing an article, which comprises applying the coating liquid as defined in [10] to a surface of a substrate by wet coating method, followed by drying to form a surface layer formed of the fluorinated ether composition on the surface of the substrate.

Advantageous Effects of Invention

According to the fluorinated ether composition of the present invention and the coating liquid containing the fluorinated ether composition, it is possible to form a surface layer which can impart excellent water/oil repellency to the surface of a substrate and of which water/oil repellency is less likely to deteriorate in long term use, thanks to excellent abrasion resistance and weather resistance.

The article of the present invention, which has a surface layer formed of the fluorinated ether composition of the present invention, has excellent water/oil repellency, and the water/oil repellency is excellent in abrasion resistance and weather resistance and is less likely to deteriorate even in long term use.

According to the method for producing an article of the present invention, it is possible to produce an article having a surface layer which can impart excellent water/oil repellency to the surface of a substrate, the water/oil repellency being excellent in abrasion resistance and weather resistance and being less likely to deteriorate even in long term use.

DESCRIPTION OF EMBODIMENTS

In this specification, a compound represented by the formula (1) will be referred to as "compound (1)". Compounds represented by other formulae will be referred to in the same manner.

The following definitions of terms are applicable throughout description and Claims.

An "etheric oxygen atom" means an oxygen atom forming an ether bond (—O—) between carbon atoms.

A "surface layer" means a layer formed of the fluorinated ether composition of the present invention, on the surface of a substrate.

A "bivalent organopolysiloxane residue" is a group represented by the following formula. $R^a$ in the following formula is an alkylene group (preferably $C_{1-10}$) or a phenyl group. g1 is an integer of at least 1, preferably an integer of from 1 to 9, particularly preferably an integer of from 1 to 4.

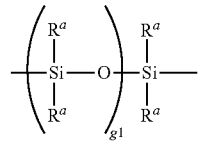

The "number average molecular weight" of a fluorinated ether compound is calculated from the number (average value) of oxyfluoroalkylene groups on the basis of terminal groups, by means of NMR analysis method by $^1$H-NMR and $^{19}$F-NMR.

[Fluorinated Ether Composition]

The fluorinated ether composition of the present invention (hereinafter sometimes referred to as "the present composition") comprises compound (1) and compound (2).

The compound (1) is a fluorinated ether compound having a poly(oxyfluoroalkylene) chain and having two silyl groups each having at least one of a hydrolyzable group and a hydroxy group bonded (hereinafter sometimes referred to as "reactive silyl group Y") at one terminal of the chain via an amide bond. The compound (2) is a fluorinated ether compound having a poly(oxyfluoroalkylene) chain and having two reactive silyl groups Y at each terminal of the chain, that is totally four groups Y, via an amide bond.

The present composition is cured and forms a surface layer on the substrate surface by reaction of the reactive silyl groups Y of the compound (1) and the compound (2). When the reactive silyl group Y has a hydrolyzable group, the hydrolyzable group is hydrolyzed to form a silanol group (Si—OH), and such silanol groups undergo intermolecular condensation reaction to form a Si—O—Si bond thereby to cause curing. In a case where the reactive silyl group Y has a hydroxy group bonded to the silicon atom, that is the group Y has a silanol group, such silanol groups undergo intermolecular condensation reaction to form a Si—O—Si bond thereby to cause curing.

Further, at the time of such curing, for example when the substrate has silanol groups on the surface as in the case of a glass substrate, the silanol groups, and the silanol groups of the compound (1) and the compound (2), or formed of the compound (1) and the compound (2), are reacted to form a Si—O—Si bond, whereby the obtainable surface layer adheres to the substrate.

In the case of the compound (1), it is considered that one terminal of the poly(oxyfluoroalkylene) chain is fixed on the substrate surface or on the interior of the surface layer, and the other terminal is typically present on the atmosphere side of the surface layer thereby to impart water/oil repellency to the surface layer. Further, in the case of the compound (2), it is considered that by curing, typically, both terminals of the poly(oxyfluoroalkylene) chain are fixed on the substrate surface or on the interior of the surface layer, and accordingly the center part of the poly(oxyfluoroalkylene) chain contributes to water/oil repellency of the surface layer. It is estimated that due to such a cured state, when the compound (1) is used alone for formation of the surface layer, high initial water/oil repellency is obtained, and when the compound (2) is used alone, as compared with the case of using the compound (1) alone, water/oil is low initially but is excellent in weather resistance and abrasion resistance.

With the present composition it is possible to impart excellent water/oil repellency to the obtainable surface layer and to make the water/oil repellency be excellent in abrasion resistance and weather resistance, by containing such a compound (1) and a compound (2). Particularly the above effects are remarkable when the compound (2) is contained in an amount of from 1.0 to 90.0 mol % to the total amount of the compound (1) and the compound (2).

(Compound (1))

The compound (1) has $(OX^{11})_{m11}$ which is a poly(oxyfluoroalkylene) chain, its end on the $X^{11}$ side is bonded to an amide group via the group $Q^{13}$, and N in the amide group is bonded to reactive silyl groups Y respectively via the groups $Q^{11}$ and $Q^{12}$. The end of the poly(oxyfluoroalkylene) chain on the O side is bonded to the group $A^{11}$.

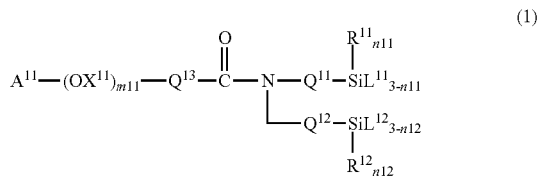

(1)

In the formula (1), $A^{11}$ is a perfluoroalkyl group,
$X^{11}$ is a fluoroalkylene group having at least one fluorine atom,
m11 is an integer of from 2 to 200,
$Q^{11}$ and $Q^{12}$ are each independently a bivalent linking group,
$R^{11}$ and $R^{12}$ are each independently a monovalent hydrocarbon group,
$L^{11}$ and $L^{12}$ are each independently a hydrolyzable group or a hydroxy group,
n11 and n12 are each independently an integer of from 0 to 2, and
$Q^{13}$ is a single bond or a bivalent linking group.

The number of carbon atoms in the perfluoroalkyl group as $A^{11}$, is in that the resulting surface layer will be more excellent in abrasion resistance, preferably from 1 to 20, more preferably from 1 to 10, further preferably from 1 to 6, particularly preferably from 1 to 3, The perfluoroalkyl group may be linear or branched, and in view of more excellent effects of the present invention, it is preferably linear.

As specific examples of the perfluoroalkyl group, $CF_3$—, $CF_3CF_2$—, $CF_3CF_2CF_2$—, $CF_3CF_2CF_2CF_2$—, $CF_3CF_2CF_2CF_2CF_2$—, $CF_3CF_2CF_2CF_2CF_2CF_2$—, and $CF_3CF(CF_3)$— may be mentioned. The perfluoroalkyl group is, in that the resulting surface layer will be more excellent in water/oil repellency, preferably $CF_3$—, $CF_3CF_2$—, or $CF_3CF_2CF_2$—.

$(OX^{11})_{m11}$ consists of m11 units represented by $(OX^{11})$ (hereinafter sometimes referred to as "units (1)") connected to one another.

$X^{11}$ is a fluoroalkylene group having at least one fluorine atom. The number of carbon atoms in the fluoroalkylene group is preferably from 1 to 6. The fluoroalkylene group may be linear or branched, and in view of more excellent effects of the present invention, it is preferably linear.

The number of fluorine atoms in the fluoroalkylene group is at least 1, and in that the resulting surface layer will be more excellent in abrasion resistance and water/oil repellency, it is preferably from (the same number as the number of carbon atoms in $X^{11}$) to (twice the number of carbon atoms in $X^{11}$), and in the case of a difluoromethylene group and in a case where the number of carbon atoms in $X^{11}$ is at least 2, it is more preferably from (twice the number of carbon atoms in $X^{11}$-2) to (twice the number of carbon atoms in $X^{11}$). The fluoroalkylene group is particularly preferably a perfluoroalkylene group (that is a fluoroalkylene group in which the number of fluorine atoms is twice the number of carbon atoms in $X^{11}$).

As specific examples of the units (1), —OCHF—, —OCF$_2$CHF—, —OCHFCF$_2$—, —OCF$_2$CH$_2$—, —OCH$_2$CF$_2$—, —OCF$_2$CF$_2$CHF—, —OCHFCF$_2$CF$_2$—, —OCF$_2$CF$_2$CH$_2$—, —OCH$_2$CF$_2$CF$_2$—, —OCF$_2$CF$_2$CF$_2$CH$_2$—, —OCH$_2$CF$_2$CF$_2$CF$_2$—, —OCF$_2$CF$_2$CF$_2$CF$_2$CH$_2$—, —OCH$_2$CF$_2$CF$_2$CF$_2$CF$_2$—, —OCF$_2$CF$_2$CF$_2$CF$_2$CF$_2$CH$_2$—, —OCH$_2$CF$_2$CF$_2$CF$_2$CF$_2$CF$_2$—, —OCF$_2$—, —OCF$_2$CF$_2$—, —OCF$_2$CF$_2$CF$_2$—, —OCF(CF$_3$)CF$_2$—, —OCF$_2$CF$_2$CF$_2$CF$_2$—, —OCF(CF$_3$)CF$_2$CF$_2$—, —OCF$_2$CF$_2$CF$_2$CF$_2$CF$_2$—, and —OCF$_2$CF$_2$CF$_2$CF$_2$CF$_2$CF$_2$— may be mentioned.

The number m11 of the units (1) in $(OX^{11})_{m11}$ is an integer of from 2 to 200, preferably an integer of from 5 to 150, more preferably an integer of from 5 to 100, particularly preferably an integer of from 10 to 50.

$(OX^{11})_{m11}$ may consist of only one type of units (1) or may consist of two or more types of units (1). The two or more types of units (1) may, for example, be two or more types of units (1) differing in the number of carbon atoms, two or more types of units (1) having the same number of carbon atoms but differing in whether the units have a side chain or not or in the type of the side chain, or two or more types of units (1) having the same number of carbon atoms but differing in the number of fluorine atoms. The numbers of the respective two or more types of units (1) may be the same or different. In a case where $(OX^{11})_{m11}$ has two or more types of units (1), the total number of the respective units (1) is m11.

Further, when $(OX^{11})_{m11}$ consists of two or more types of units (1), the bonding order of the two or more types of units (1) is not limited, and they may be arranged randomly, alternately or in blocks. $(OX^{11})_{m11}$ of such a constitution contributes to improvement of sliding property of the resulting surface layer.

When $(OX^{11})_{m11}$ has $(OCF_2)$ and $(OCF_2CF_2)$, the proportion of $(OCF_2CF_2)$ to $(OCF_2)$ is preferably from 0.1 to 10, more preferably from 0.2 to 5, further preferably from 0.2 to 2, particularly preferably from 0.2 to 1.5, most preferably from 0.2 to 0.85. Further, $(OX^{11})_{m11}$ is preferably a chain having $(OCF_2)$ and $(OCF_2CF_2)$ randomly arranged.

When $(OX^{11})_{m11}$ has $(OCF_2CF_2)$ and $(O(CF_2)_k)$ (wherein k is an integer of at least 3), $(OX^{11})_{m11}$ is preferably a chain having $(OCF_2CF_2)$ and $(O(CF_2)_k)$ alternately arranged. k is preferably an integer of from 3 to 8, and $(O(CF_2)_k)$ is more preferably $(OCF_2CF_2CF_2CF_2)$.

$(OX^{11})_{m11}$ of such a constitution contributes to high water/oil repellency of the resulting surface layer and improvement of abrasion resistance.

The compound (1) has, as the reactive silyl groups Y, $-Si(R^{11})_{n11}L^{11}_{3-n11}$ and $-Si(R^{12})_{n12}L^{12}_{3-n12}$. $-Si(R^{11})_{n11}L^{11}_{3-n11}$ and $-Si(R^{12})_{n12}L^{12}_{3-n12}$ may be the same or different. In view of availability of materials and production efficiency of the fluorinated ether compound, they are preferably the same.

$R^{11}$ and $R^{12}$ are each independently a monovalent hydrocarbon group, preferably a monovalent saturated hydrocarbon group. The number of carbon atoms in each of $R^{11}$ and $R^{12}$ is preferably from 1 to 6, more preferably from 1 to 3, particularly preferably from 1 to 2.

$L^{11}$ and $L^{12}$ are each independently a hydrolyzable group or a hydroxy group. As specific examples of the hydrolyzable group in each of $L^{11}$ and $L^{12}$, an alkoxy group, a halogen atom, an acyl group and an isocyanate group (—NCO) may be mentioned. The alkoxy group is preferably a $C_{1-4}$ alkoxy group. The halogen atom is preferably a chlorine atom.

$L^{11}$ and $L^{12}$ are, in view of more easy production of the compound (1), preferably a $C_{1-4}$ alkoxy group or a halogen atom. $L^{11}$ and $L^{12}$ are, in that outgassing at the time of coating is small and the present composition containing the compound (1) will be more excellent in storage stability, preferably a $C_{1-4}$ alkoxy group, and in a case where the present composition containing the compound (1) is required to have long-term storage stability, particularly preferably an ethoxy group, and in a case where the reaction time after coating is to be short, particularly preferably a methoxy group.

n11 and n12 are each independently an integer of from 0 to 2. n11 and n12 are preferably 0 or 1, particularly preferably 0. By the presence of two or more $L^{11}$ and $L^{12}$, adhesion of the surface layer to the substrate will be stronger. When n11 and n12 are 0 or 1, the two or more $L^{11}$ and $L^{12}$ present in one molecule may the same of different. In view of availability of materials and production efficiency of the fluorinated ether compound, they are preferably the same. When n11 and n12 are 2, the two $R^{11}$ and $R^{12}$ present in one molecule may be the same or different. In view of availability of materials and production efficiency of the fluorinated ether compound, they are preferably the same.

In the compound (1), $Q^{11}$ and $Q^{12}$ are each independently a bivalent linking group. $Q^{11}$ and $Q^{12}$ may, for example, be an alkylene group, or a group having a bivalent organopolysiloxane residue, an etheric oxygen atom or —NH— between carbon atoms of an alkylene group having at least 2 carbon atoms.

The number of carbon atoms in the alkylene group represented by each of $Q^{11}$ or $Q^{12}$ is preferably from 1 to 10, particularly preferably form 2 to 6. The number of carbon atoms in the group having a bivalent organopolysiloxane residue, an etheric oxygen atom or —NH— between carbon atoms of an alkylene group having at least 2 carbon atoms, represented by each of $Q^{11}$ or $Q^{12}$ is preferably from 2 to 10, particularly preferably from 2 to 6.

$Q^{11}$ and $Q^{12}$ are, in view of easy production of the compound, preferably —$CH_2CH_2CH_2$—, —$CH_2CH_2OCH_2CH_2CH_2$—, or —$CH_2CH_2NHCH_2CH_2CH_2$— (provided that the right side is bonded to Si).

$Q^{13}$ is a single bond or a bivalent linking group. The bivalent linking group may, for example, be an alkylene group or a group having an etheric oxygen atom, —C(O)—, —C(O)O—, —OC(O)— or —NH— between carbon atoms of an alkylene group having at least 2 carbon atoms.

The number of carbon atoms in the alkylene group represented by $Q^{13}$ is preferably from 1 to 10, particularly preferably from 1 to 6. The number of carbon atoms in the group having an etheric oxygen atom, —C(O)—, —C(O)O—, —OC(O)— or —NH-between carbon atoms of an alkylene group having at least 2 carbon atoms, represented by $Q^{13}$, is preferably from 2 to 10, particularly preferably from 2 to 6.

$Q^{13}$ is, in view of easy production of the compound, preferably a single bond, —$CH_2$—, —$CH_2CH_2$—, —$CH_2CH_2CH_2$—, —$CH_2OCH_2CH_2$—, —$CH_2NHCH_2CH_2$—, or —$CH_2CH_2OC(O)CH_2CH_2$— (provided that the right side is bonded to C(O)), particularly preferably a single bond.

The number average molecular weight (Mn) of the compound (1) is, in view of the abrasion resistance of the resulting surface layer, preferably from 500 to 20,000, more preferably from 800 to 10,000, particularly preferably from 1,000 to 8,000. The present composition may contain one type of compound (1) or two or more types.

The number average molecular weight (Mn) of the compound (1) is a value obtained by means of NMR analysis method in accordance with the following method. That is, by 19F-NMR (solvent: $CDCl_3$, internal standard: $CFCl_3$), the repeating units of $(OX^{11})_{m11}$ are identified and the number of the repeating units is calculated, and the average value of the molecular weight of $(OX^{11})_{m11}$ per molecule is calculated. Then, by 1H-NMR (solvent: $CDCl_3$, internal standard: TMS), the terminal groups are identified and quantitatively determined, and based on the number of moles of the terminal group, the number average molecular weight (Mn) of the compound (1) is calculated. Hereinafter, the number average molecular weight may sometimes be referred to simply as "Mn".

As specific examples of the compound (1), perfluoropolyether-modified aminosilanes described in JP-A-2000-327772 and fluorinated ether compounds described in WO2018/043166 may be mentioned.

The compound (1) is obtained, for example, by subjecting $A^{11}(OX^{11})_{m11}$-$Q^{13}$-C(O)N[$Q^a$-CH=$CH_2$][$Q^b$-CH=$CH_2$] (wherein $Q^a$ and $Q^b$ are a single bond or a bivalent linking group) and a silane compound having a hydrolyzable group and a hydrogen atom bonded to the silicon atom, for example $HSi(R^{11})_{n11}L^{11}_{3-n11}$ or $HSi(R^{12})_{n12}L^{12}_{3-n12}$ to hydrosilylation. Preferably only one type of silane compound is used for the reaction.

(Compound (2))

The compound (2) has $(OX^{21})_{m21}$ which is a poly (oxyfluoroalkylene) chain, and its end on the $X^{21}$ side is bonded to an amide group via the group $Q^{23}$, and N in the amide group is bonded to reactive silyl groups Y respectively via the groups $Q^{21}$ and $Q^{22}$. The end of the poly (oxyfluoroalkylene) chain on the O side is bonded to an amide group via the group $Q^{24}$, and N in the amide group is bonded to reactive silyl groups Y respectively via the groups $Q^{31}$ and $Q^{32}$.

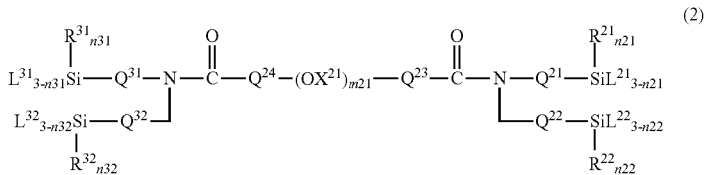

(2)

In the formula (2), $X^{21}$ is a fluoroalkylene group having at least one fluorine atom, m21 is an integer of from 2 to 200, $Q^{21}$, $Q^{22}$, $Q^{31}$, $Q^{32}$ and $Q^{24}$ are each independently a bivalent linking group, $R^{21}$, $R^{22}$, $R^{31}$ and $R^{32}$ are each independently a monovalent hydrocarbon group, $L^{21}$, $L^{22}$, $L^{31}$ and $L^{32}$ are each independently a hydrolyzable group or a hydroxy group, n21, n22, n31 and n32 are each independently an integer of from 0 to 2, and $Q^{23}$ is a single bond or a bivalent linking group.

$(OX^{21})_{m21}$ consists of m21 units represented by $(OX^{21})$ (hereinafter sometimes referred to as "units (2)") connected to one another. The units (2) are similar to the units (1) in the compound (1) including the preferred embodiments. m21 is similar to m11 in the compound (1) including the preferred embodiments. $(OX^{11})_{m11}$ in the compound (1) and $(OX^{21})_{m21}$ in the compound (2) may be the same or different.

The compound (2) has, as the reactive silyl groups Y, $-Si(R^{21})_{n21}L^{21}_{3-n21}$, $-Si(R^{22})_{n22}L^{22}_{3-n22}$, $-Si(R^{31})_{n31}L^{31}_{3-n31}$, and $-Si(R^{32})_{n32}L^{32}_{3-n32}$. The four reactive silyl groups Y in the compound (2) are similar to the two reactive silyl groups Y, $-Si(R^{11})_{n11}L^{11}_{3-n11}$, and $-Si(R^{12})_{n12}L^{12}_{3-n12}$, in the compound (1), including the preferred embodiments. The four reactive silyl groups Y in the compound (2) may be the same or different. Further, the two reactive silyl groups Y in the compound (1) and the four reactive silyl groups Y in the compound (2) may be the same or different. In view of availability of the materials and production efficiency of the fluorinated ether compound, the four reactive silyl groups Y are preferably the same.

In the compound (2), $Q^{21}$, $Q^{22}$, $Q^{31}$ and $Q^{32}$ are each independently a bivalent linking group, and are similar to $Q^{11}$ and $Q^{12}$ in the compound (1) including the preferred embodiments. Further, $Q^{23}$ in the compound (2) is similar to $Q^{13}$ in the compound (1) including the preferred embodiments.

$Q^{24}$ in the compound (2) is a bivalent linking group, and may be an alkylene group which may be substituted with a fluorine atom, or a group having an etheric oxygen atom, —C(O)—, —C(O)O—, —OC(O)— or —NH— between carbon atoms of an alkylene group having at least 2 carbon atoms.

The number of carbon atoms in the alkylene group which may be substituted with a fluorine atom, represented by $Q^{24}$, is preferably from 1 to 10, particularly preferably from 1 to 6. The number of carbon atoms in the group having an etheric oxygen atom, —C(O)—, —C(O)O—, —OC(O)— or —NH— between carbon atoms of an alkylene group having at least 2 carbon atoms, represented by $Q^{24}$, is preferably from 2 to 10, particularly preferably from 2 to 6.

$Q^{24}$ is, in view of easy production of the compound, preferably —CH$_2$—, —CH$_2$CH$_2$—, —CH$_2$CH$_2$CH$_2$—, —CF$_2$—, —CF$_2$CF$_2$—, —CF$_2$CF$_2$CF$_2$—, —CH$_2$CH$_2$OCH$_2$—, —CH$_2$CH$_2$NHCH$_2$—, or —CH$_2$CH$_2$C(O)OCH$_2$CH$_2$— (provided that the left side is bonded to C). When $X^{11}$ is a perfluoroalkylene group, $Q^{24}$ is particularly preferably a perfluoroalkylene group.

The number average molecular weight (Mn) of the compound (2) is, in view of abrasion resistance of the surface layer, preferably from 500 to 20,000, more preferably from 800 to 10,000, particularly preferably from 1,000 to 8,000. Mn of the compound (2) is obtained in the same manner as Mn of the compound (1). The present composition may contain one type of compound (2) or two or more types.

As specific examples of the compound (2), for example, perfluoropolyether-modified aminosilanes described in JP-A-2002-121277 may be mentioned.

The compound (2) is obtained, in the same manner as the compound (1), for example, by subjecting [CH$_2$=CH-Q$^{d'}$][CH$_2$=CH-Q$^{c'}$]N(O)C-Q$^{24}$-(OX$^{11}$)$_{m11}$-Q$^{23}$-C(O)N[Q$^c$-CH=CH$_2$][Q$^d$-CH=CH$_2$] (wherein Q$^c$, Q$^d$, Q$^{c'}$ and Q$^{d'}$ are a single bond or a bivalent linking group) and a silane compound having a hydrolyzable group and a hydrogen atom bonded to the silicon atom, for example, HSi(R$^{21}$)$_{n21}$L$^{21}_{3-n21}$, HSi(R$^{22}$)$_{n22}$L$^{22}_{3-n22}$, HSi(R$^{31}$)$_{n31}$L$^{31}_{3-n31}$, or HSi(R$^{32}$)$_{n32}$L$^{32}_{3-n32}$, to hydrosilylation. Preferably only one type of silane compound is used for the reaction.

(The Present Composition)

The present composition can be produced by mixing the compound (1) and the compound (2). As the ratio of the compound (1) and the compound (2) in the present composition, the ratio of the compound (2) to the total amount of the compound (1) and the compound (2) is preferably from 1.0 to 90.0 mol %. The ratio of the compound (2) to the total amount of the compound (1) and the compound (2) is more preferably from 2.0 to 50.0 mol %.

The present composition, which contains the compound (1) and the compound (2) in the above ratio, has more remarkable effects of imparting excellent water/oil repellency to the resulting surface layer, and making the water/oil repellency be excellent in abrasion resistance and weather resistance.

The ratio of the compound (2) to the total amount of the compound (1) and the compound (2) in the present composition may properly be adjusted depending upon the properties required for the obtainable surface layer. For example, in a case where particularly high weather resistance is to be imparted to the surface layer, the above ratio is preferably from 10.0 to 50.0 mol %. Further, in a case where particularly high abrasion resistance and particularly high weather resistance are to be imparted to the surface layer, it is preferably from 5.0 to 50.0 mol %. In a case where particularly high water/oil repellency is to be imparted to the surface layer, the above ratio is preferably from 2.0 to 30.0 mol %.

The combination of the compound (1) and the compound (2) in the present composition is preferably a combination such that $(OX^{11})_{m11}$ and $(OX^{21})_{m21}$ which are the poly (oxyfluoroalkylene) chains in the compound (1) and the compound (2) have the same structure.

Further, when $(OX^{11})_{m11}$ and $(OX^{21})_{m21}$ have, as the units (1) and the units (2), $(OCF_2)$ and $(OCF_2CF_2)$, the ratio of the compound (2) to the total amount of the compound (1) and the compound (2) is preferably from 10.0 to 50.0 mol %, whereby more remarkable effects of imparting excellent water/oil repellency to the obtainable surface layer and making the water/oil repellency be excellent in abrasion resistance and weather resistance are obtained.

When $(OX^{11})_{m11}$ and $(OX^{21})_{m21}$ has, as the units (1) and the units (2), $(OCF_2CF_2)$ and $(O(CF_2)_k)$ alternately, the ratio of the compound (2) to the total amount of the compound (1) and the compound (2) is preferably from 5.0 to 30.0 mol %, whereby more remarkable effects of imparting excellent water/oil repellency to the obtainable surface layer and making the water/oil repellency be excellent in abrasion resistance and weather resistance are obtained.

In the present composition, the compound (1) and the compound (2) may respectively be contained as the compounds as they are, or may be contained in such a state that a part of hydrolyzable group of the reactive silyl group Y in each compound if any, is hydrolyzed, and the silanol group of the reactive silyl group Y if any, or the silanol group formed by the above hydrolysis reaction, is partly condensed.

The total content of the compound (1) and the compound (2) in the present composition is, to the total amount of the composition, preferably from 50 to 100 mass %, more preferably from 90 to 100 mass %, further preferably from 99 to 100 mass %, particularly preferably from 99.5 to 100 mass %.

The present composition may contain, within a range not to impair the effects of the present invention, an optional component. The optional component may, for example, be known additives such as a fluorinated oil, a surfactant, and an acid catalyst or a basic catalyst to promote hydrolysis and condensation reaction of the reactive silyl groups Y in the compound (1) and the compound (2). The acid catalyst may, for example, be hydrochloric acid, nitric acid, acetic acid sulfuric acid, phosphoric acid, sulfonic acid, methanesulfonic acid or p-toluenesulfonic acid. The basic catalyst may, for example, be sodium hydroxide, potassium hydroxide or ammonia.

As the optional component contained in the fluorinated ether composition, a fluorinated oil is preferred. The fluorinated oil is preferably a perfluoropolyether oil. The perfluoropolyether oil is preferably a compound having a perfluoropolyether chain consisting of oxyperfluoroalkylene units similar to $(OX^{11})$ or $(OX^{21})$ and a perfluoroalkyl group at both ends of the chain. As the perfluoropolyether oil, for example, FOMBLIN (registered trademark) M series or Z series, manufactured by Solvay Solexis may, for example, be mentioned.

The optional component may include by-products formed in the process for producing the compound (1) and the compound (2) and impurities such as unreacted compounds in the production process. As the impurities, for example, $F_3CCF_2CF_2$—$OCF(CF_3)$—$C(O)N[$—$CH_2$—$CH$=$CH_2]_2$, the above described $A^{11}(OX^{11})_{m11}$-$Q^{13}$-$C(O)N[Q^a$-$CH$=$CH_2][Q^b$-$CH$=$CH_2]$, the above described $[CH_2$=$CH$-$Q^{d'}][CH_2$=$CH$-$Q^{c'}]N(O)C$-$Q^{24}$-$(OX^{11})_{m11}$-$Q^{23}$-$C(O)N[Q^c$-$CH$=$CH_2][Q^d$-$CH$=$CH_2]$, and tetramethylvinylsiloxane may be mentioned.

The content of the optional component is, to the total amount of the present composition, preferably at most 50 mass %, more preferably at most 20 mass %, further preferably at most 10 mass %, furthermore preferably at most 1 mass %, particularly preferably at most 0.5 mass %.

In a case where the optional component is the fluorinated oil, the content of the fluorinated oil is, to the total amount of the present composition, preferably from 0.1 to 50 mass %, more preferably from 1 to 45 mass %, further preferably from 10 to 40 mass %, particularly preferably from 15 to 35 mass %, most preferably from 20 to 33 mass %. In a case where the optional component is the fluorinated oil, the total content of the compound (1) and the compound (2) is, to the total amount of the composition, preferably from 50 to 99.9 mass %, more preferably from 55 to 99 mass %, further preferably from 60 to 90 mass %, particularly preferably from 65 to 85 mass %, most preferably from 67 to 80 mass %.

[Coating Liquid]

The coating liquid of the present invention (hereinafter sometimes referred to as "the present coating liquid") contains the present composition and a liquid medium. The present coating liquid is not limited so long as it is in a liquid form and may be a solution or a dispersion.

The content of the present composition in the present coating liquid is, to the present coating liquid, preferably from 0.001 to 50 mass %, more preferably from 0.001 to 20 mass %, further preferably from 0.001 to 10 mass %, particularly preferably from 0.01 to 1 mass %.

(Liquid Medium)

The liquid medium is preferably an organic solvent. The organic solvent may be a fluorinated organic solvent or a non-fluorinated organic solvent, or may be a mixture thereof.

The fluorinated organic solvent may, for example, be a fluorinated alkane, a fluorinated aromatic compound, a fluoroalkyl ether, a fluorinated alkylamine or a fluoroalcohol.

The fluorinated alkane is preferably a $C_{4-8}$ compound. As commercial products, $C_6F_{13}H$ (manufactured by AGC Inc., ASAHIKLIN (registered trademark) AC-2000), $C_6F_{13}C_2H_5$ (manufactured by AGC Inc., ASAHIKLIN (registered trademark) AC-6000), $C_2F_5CHFCHFCF_3$ (manufactured by Chemours, Vertrel (registered trademark) XF) may, for example, be mentioned.

The fluorinated aromatic compound may, for example, be hexafluorobenzene, trifluoromethylbenzene, perfluorotoluene or bis(trifluoromethyl)benzene.

The fluoroalkyl ether is preferably a $C_{4-12}$ compound. As commercial products, $CF_3CH_2OCF_2CF_2H$ (manufactured by AGC Inc., ASAHIKLIN (registered trademark) AE-3000), $C_4F_9OCH_3$ (manufactured by 3M, Novec (registered trademark) 7100), $C_4F_9OC_2H_5$ (manufactured by 3M, Novec (registered trademark) 7200), and $C_2F_5CF(OCH_3)C_3F_7$ (manufactured by 3M, Novec (registered trademark) 7300) may, for example, be mentioned.

The fluorinated alkylamine may, for example, be perfluorotripropylamine or perfluorotributylamine.

The fluoroalcohol may, for example, be 2,2,3,3-tetrafluoropropanol, 2,2,2-trifluoroethanol or hexafluoroisopropanol.

The non-fluorinated organic solvent may, for example be a compound consisting solely of hydrogen atoms and carbon atoms or a compound consisting solely of hydrogen atoms, carbon atoms and oxygen atoms, preferably a hydrocarbon, an alcohol, a ketone, an ether or an ester.

The liquid medium may be a single medium or a mixed medium of two or more types. The mixed medium may, for example, be a mixed medium of AC-6000 and AE-3000 in a mass ratio of from 1:99 to 99:1, a mixed medium of Novec 7200 and Novec 7100 in a mass ratio of from 1:99 to 99:1 or a mixed medium of AC-6000 and 2,2,3,3-tetrafluoropropanol in a mass ratio of from 50:50 to 99:1.

The content of the liquid medium is, in the present coating liquid, preferably from 50 to 99.999 mass %, more preferably from 80 to 99.999 mass %, further preferably from 90 to 99.999 mass %, particularly preferably from 99 to 99.99 mass %.

[Article]

The article of the present invention (hereinafter sometimes referred to as "the present article") comprises a substrate and a surface layer formed of the present composition on the surface of the substrate.

The thickness of the surface layer is preferably from 0.1 to 100 nm, particularly preferably from 0.1 to 50 nm. When the thickness of the surface layer is at least the lower limit value of the above range, sufficient effects by the surface layer will be obtained. When the thickness of the surface layer is at most the upper limit value of the above range, high utilization efficiency will be obtained. The thickness of the surface layer is calculated from the oscillation period of an interference pattern of reflected X-rays obtained by X-ray reflectometry using an X-ray diffractometer for thin film analysis (manufactured by Rigaku Corporation, ATX-G).

The substrate may be a substrate which is desired to have water/oil repellency imparted. The material of the substrate may, for example, be a metal, a resin, glass, sapphire, ceramic, stone or a composite material thereof. The glass may be chemically tempered. The glass is particularly preferably soda lime glass, alkali aluminosilicate glass, borosilicate glass, alkali free glass, crystal glass or quartz glass, more preferably chemically tempered soda lime glass, chemically tempered alkali aluminosilicate glass or chemically tempered borosilicate glass. The transparent resin is preferably an acrylic resin or a polycarbonate.

The substrate may have a primer film such as a $SiO_2$ film formed on its surface. The substrate is properly selected depending upon the application of the present article.

[Method for Producing Article]

In the method for producing the present article, the method of forming the surface layer on the surface of the substrate by using the present composition may be either dry coating method or wet coating method.

In a case where the surface layer is formed by dry coating method, preferred is a method of treating the surface of the substrate with the present composition by dry coating method. In a case where the surface layer is formed by wet coating method, preferred is a method of applying the present coating liquid to the surface of the substrate, followed by drying to form the surface layer.

The dry coating method may, for example, be a physical deposition method (such as vacuum deposition method, ion plating method or sputtering method), a chemical deposition method (such as thermal CVD method, plasma CVD method or photo CVD method), or ion beam sputtering method. With a view to suppressing decomposition of the compounds in the present composition and in view of simplicity of the apparatus, vacuum deposition method is particularly preferred. At the time of vacuum deposition, a pellet-form substance having a metal porous body of e.g. iron or steel impregnated with the present composition may be used. A pellet-form substance having a metal porous body impregnated with the present composition, obtained by impregnating a metal porous body of e.g. iron or steel with the present coating liquid, followed by drying and removing the liquid medium, may be used.

In the wet coating method, as a method of applying the present coating liquid to the surface of the substrate, spin coating method, wipe coating method, spray coating method, squeeze coating method, dip coating method, die coating method, ink-jet method, flow coating method, roll coating method, casting method, Langmuir-Blodgett method and gravure coating method may, for example, be mentioned.

At the time of forming the surface layer by dry coating method or wet coating method, in order to improve abrasion resistance of the surface layer, as the case requires, a post-treatment such as heating, humidification or light irradiation may be conducted to obtain the surface layer. By such a treatment, for example, when an unreacted hydrolyzable group or hydroxy group bonded to the silicon atom derived from the reactive silyl group Y in the compound (1) and the compound (2), or a silanol group after hydrolysis, is present in the surface layer, hydrolysis reaction of such a group or condensation reaction of the hydrolyzable group is promoted, whereby a sufficiently cured surface layer will be obtained.

The surface layer which the present article has on the substrate, has excellent water/oil repellency, and the water/oil repellency is excellent in abrasion resistance and weather resistance and is less likely to deteriorate even in long term use.

EXAMPLES

Now, the present invention will be described in further detail with reference to Examples. However, the present invention is by no means restricted to such specific Examples. In the following, "%" means "mass %" unless otherwise specified.

[Production of Compound (1) and Compound (2)]

(Production of Compound (1-1))

<Step 1>

As the material of compound (1-1), compound (1-1a) was obtained in accordance with the method described in Example 11 (Specifically Ex. 11-1 to 11-3) of WO2013/121984.

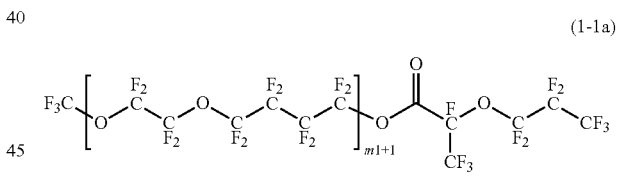

(1-1a)

Average of m1: 13, number average molecular weight: 5,050.

<Step 2>

Into a 50 mL three-necked flask, 10.1 g of the compound (1-1a) obtained in Step 1, 0.97 g of diallylamine (manufactured by KANTO CHEMICAL CO., INC.) and 10.0 g of 1,1,1,2,2,3,3,4,4,5,5,6,6-tridecafluorooctane (manufactured by AGC Inc., ASAHIKLIN (registered trademark) AC-6000) were put, followed by stirring at room temperature for 8 hours. The entire reaction crude liquid was subjected to filtration in a nitrogen atmosphere to remove by-product diallylamine hydrofluoric acid salt, and the filtrate was concentrated by an evaporator to obtain 9.8 g of a crude product. The crude product was subjected to silica gel column chromatography to obtain 9.5 g (yield: 99%) of compound (1-1b). In the silica gel column chromatography, AC-6000 was used as the developing solvent. When the desired product was recovered, the developing solvent was distilled off by a rotary evaporator, and recovered and reused for the developing solvent.

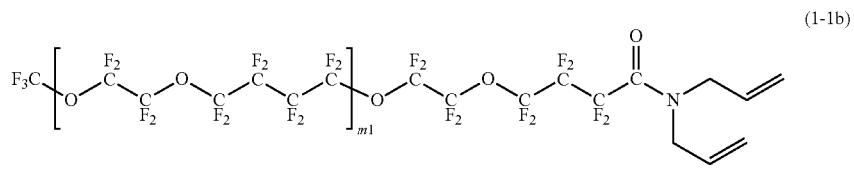

(1-1b)

Average of m1: 13.

<Step 3>

Into a 100 mL eggplant flask equipped with a thermometer, a reflux condenser and a stirrer, 5.0 g of the compound (1-1 b) obtained in Step 2, 0.03 g of a xylene solution (platinum content: 2 mass %) of a platinum/1,3-divinyl-1, 1,3,3-tetramethyldisiloxane complex, 0.36 g of trimethoxysilane, 0.01 g of aniline and 2.0 g of AC6000 were put, followed by stirring at room temperature for 8 hours. The solvent and the like were distilled off, and the remaining liquid was subjected to filtration through a membrane filter having a pore size of 0.5 μm to obtain 5.2 g (yield: 99%) of compound (1-1).

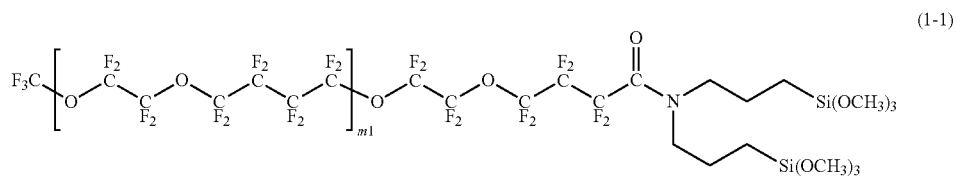

(1-1)

Average of m1: 13, number average molecular weight: 5,040.

(Production of Compound (1-2))

<Step 1>

As the material of compound (1-2), compound (1-2a) was obtained in accordance with the method described in Example 1-3 (specifically compound (13-1)) of WO2017/038830.

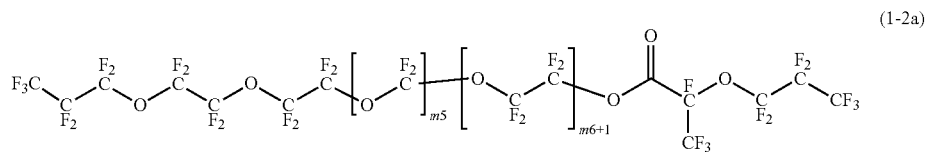

(1-2a)

Average of m5: 21, average of m6: 20, number average molecular weight: 4,550.

<Step 2>

Compound (1-2b) was obtained in the same manner except that in Step 2 in Example for producing compound (1-1) (in preparation of the compound (1-1b)), the compound (1-2a) was used instead of the compound (1-1a).

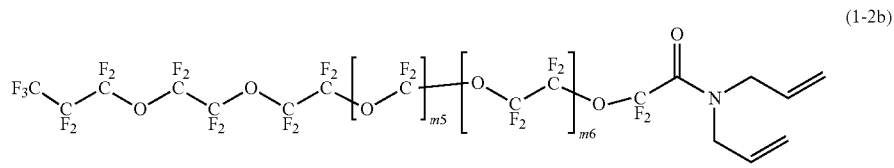

(1-2b)

Average of m5: 21, average of m6: 20.

<Step 3>

Compound (1-2) was obtained in the same manner except that in Step 3 in Example for producing the compound (1-1), the compound (1-2b) was used instead of the compound (1-1b).

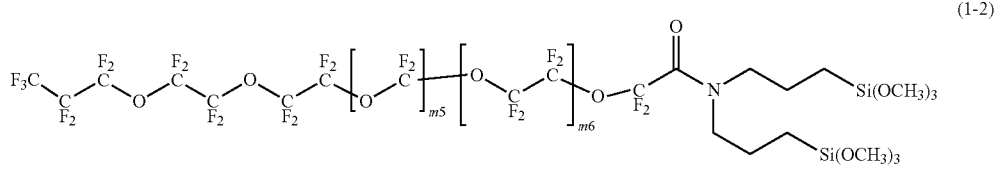

(1-2)

Average of m5: 21, average of m6: 20, number average molecular weight: 4,540.

(Production of Compound (2-1))

<Step 1>

Compound (2-1a) was obtained in accordance with Ex. 1-1 in Examples of WO2013-121984.

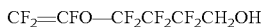

$CF_2=CFO-CF_2CF_2CF_2CH_2OH$ (2-1a)

<Step 2>

Into a 200 mL eggplant flask, 16.2 g of HO—CH$_2$CF$_2$CF$_2$CH$_2$—OH and 13.8 g of potassium carbonate were put, followed by stirring at 120° C., and 278 g of the compound (2-1a) obtained in Step 1 was added, followed by stirring at 120° C. for 2 hours. The temperature was returned to 25° C., and 50 g each of 1,1,1,2,2,3,3,4,4,5,5,6,6-tridecafluorohexane (manufactured by AGC Inc., ASAHIKLIN (registered trademark) AC-2000) and hydrochloric acid were put, followed by liquid separation, and the resulting organic phase was concentrated. The obtained reaction crude liquid was purified by column chromatography to obtain 117.7 g (yield: 40%) of compound (2-1b) as a reaction product of HO—CH$_2$CF$_2$CF$_2$CH$_2$—OH and the compound (2-1a).

<Step 3>

Into a 100 mL eggplant flask to which a reflux condenser was connected, 10.0 g of the compound (2-1b) obtained in Step 2, 1.20 g of sodium fluoride powder, and 80.0 g of dichloropentafluoropropane (a mixed solvent of CF$_3$CF$_2$CHCl$_2$:3,3-dichloro-1,1,1,2,2-pentafluoropropane and 1,3-dichloro-1,1,2,2,3-pentafluoropropane, manufactured by AGC Inc., ASAHIKLIN (registered trademark) AK-225) were put, and 9.9 g of CF$_3$CF$_2$CF$_2$OCF(CF$_3$)COF was added. In a nitrogen atmosphere, the mixture was stirred at 40° C. for 24 hours and stirred at room temperature overnight. The sodium fluoride powder was removed by a pressure filter, and excess CF$_3$CF$_2$CF$_2$OCF(CF$_3$)COF and AK-225 were distilled off under reduced pressure. High polarity impurities were removed by silica gel chromatography (developing solvent: AK-225) to obtain 9.0 g (yield: 75%) of compound (2-1c) as a reaction product of the compound (2-1b) and CF$_3$CF$_2$CF$_2$OCF(CF$_3$)COF.

<Step 4>

An autoclave (nickel made, internal capacity: 500 mL) was prepared, and to the gas outlet of the autoclave, a condenser kept at 0° C., a NaF pellet-packed bed and a condenser kept at −10° C. were installed in series. Further, a liquid returning line to return the liquid condensed in the condenser kept at −10° C. to the autoclave was installed.

Into the autoclave, 312 g of trichlorotrifluoroethane (CCl$_2$FCClF$_2$;R-113) was charged, followed by stirring while keeping the temperature to be 25° C. A nitrogen gas was blown into the autoclave at 25° C. for 1 hour, and a 20% fluorine gas was blown at 25° C. at a flow rate of 2.0 L/hr for 1 hour. Then, while a 20% fluorine gas was blown at the same flow rate, into the autoclave, a solution having 8.4 g of the compound (2-1c) obtained in Step 3 dissolved in 84 g of R-113 was injected over a period of 3.6 hours.

Then, while a 20% fluorine gas was blown at the same flow rate, the internal pressure in the autoclave was elevated to 0.15 MPa (gauge pressure). Into the autoclave, 9 mL of a benzene solution containing 0.015 g/mL of benzene in R-113 was injected while heating from 25° C. to 40° C., and the benzene solution inlet of the autoclave was closed. After stirring for 15 minutes, 6 mL of the benzene solution was injected again while keeping the temperature to be 40° C., and the inlet was closed. The same operation was conducted further for 3 times. The total amount of benzene injected was 0.33 g.

Further, while a 20% fluorine gas was blown at the same flow rate, stirring was continued for 1 hour. Then, the pressure in the autoclave was returned to atmospheric pressure, and a nitrogen gas was blown for 1 hour. The content in the autoclave was concentrated by an evaporator to obtain 8.8 g (yield: 99%) of compound (2-1d).

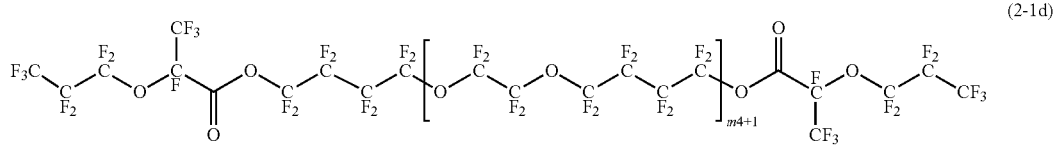

(2-1d)

Average of m4: 10.

<Step 5>

Compound (2-1e) was obtained in the same manner except that in Step 2 in Example for producing the compound (1-1) (in preparation of the compound (1-1b)), the compound (2-1d) was used instead of the compound (1-1a).

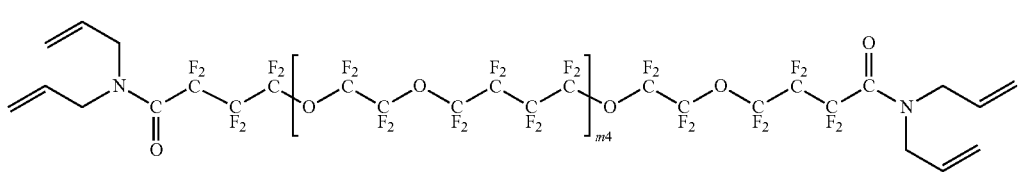

(2-1e)

Average of m4: 10.

<Step 6>

Compound (2-1) was obtained in the same manner except that in Step 3 in Example for producing the compound (1-1), the compound (2-1e) was used instead of the compound (1-1b).

<Step 4>

Compound (2-2e) was obtained in the same manner except that in Step 2 in Example for producing the compound (1-1) (in preparation of the compound (1-1b)), the compound (2-2d) was used instead of the compound (1-1a).

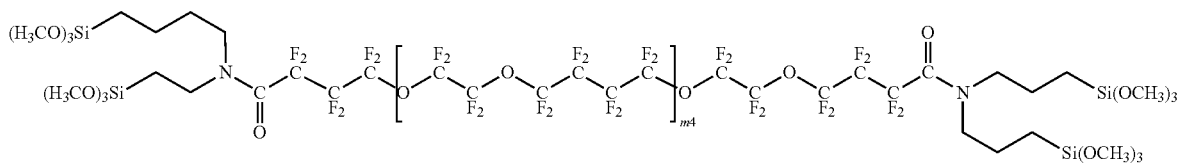

(2-1)

Average of m4: 10, number average molecular weight: 4,490.

(Production of Compound (2-2))

<Step 1>

Compound (2-2b) (Fluorolink D4000, manufactured by Solvay Solexis) was prepared.

$$HOCH_2(CF_2O)_{m7}(CF_2CF_2O)_{m8}CF_2CH_2OH \quad (2\text{-}2b)$$

Average of m7+m8: 44, number average molecular weight: 4,080.

<Step 2>

Compound (2-2c) was obtained in the same manner except that in Step 3 in Examples for producing the compound (2-1) (in preparation of the compound (2-1c)), the compound (2-2b) was used instead of the compound 2-1b.

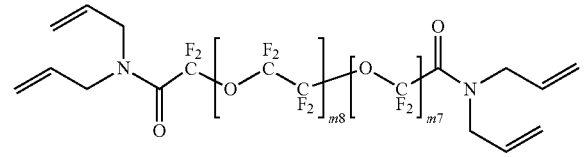

(2-2e)

Average of m7+m8: 44.

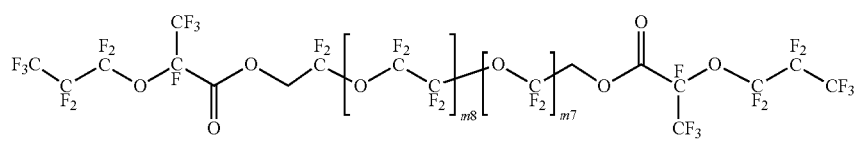

(2-2c)

Average of m7+m8: 44.

<Step 3>

Compound (2-2d) was obtained in the same manner except that in Step 4 in Example for producing the compound (2-1) (in preparation of the compound (2-1d)), the compound (2-2c) was used instead of the compound (2-1c).

<Step 5>

Compound (2-2) was obtained in the same manner except that in Step 3 in Example for producing the compound (1-1), the compound (2-2e) was used instead of the compound (1-1b).

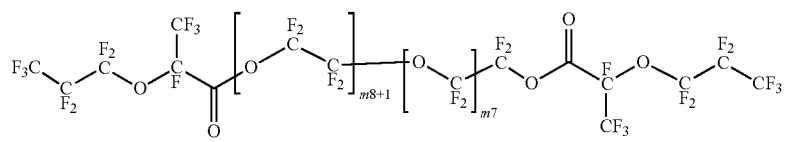

(2-2d)

Average of m7+m8: 44.

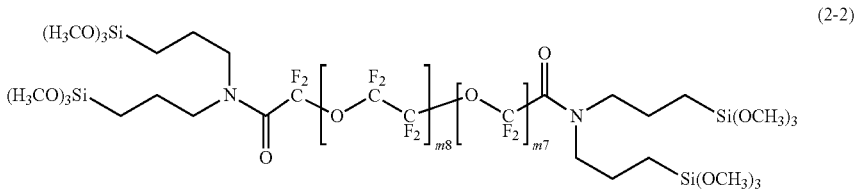

(2-2)

Average of m7+m8: 44, number average molecular weight: 4,755.
[Fluorinated Oil]
Compound (3-1) (FOMBLIN M15 manufactured by Solvay Solexis) was prepared.

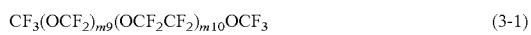

$CF_3(OCF_2)_{m9}(OCF_2CF_2)_{m10}OCF_3$   (3-1)

Average of m9+m10: 105, number average molecular weight: 9,700.

Ex. 1 to 22

The above obtained compound (1-1) or (1-2), compound (2-1) or (2-2) and fluorinated oil were mixed in a combination and a proportion as identified in Table 1 to produce fluorinated ether compositions in Ex. 1 to 22. Ex. 1 to 18 are Examples of the present invention, and Ex. 19 to 22 are Comparative Examples. The fluorinated ether composition obtained in Ex. 1 will hereinafter be referred to as "composition 1". The same applies to the fluorinated ether compositions obtained in other Ex.

TABLE 1

| | Composition | | | | |
|---|---|---|---|---|---|
| | Compound (1) *1 [mol %] | | Compound (2) *2 [mol %] | | Fluorinated oil *3 |
| Ex. | (1-1) | (1-2) | (2-1) | (2-2) | [mass %] |
| 1 | 99 | — | 1 | — | 0 |
| 2 | 98 | — | 2 | — | 0 |
| 3 | 95 | — | 5 | — | 0 |
| 4 | 90 | — | 10 | — | 0 |
| 5 | 80 | — | 20 | — | 0 |
| 6 | 70 | — | 30 | — | 0 |
| 7 | 70 | — | 30 | — | 25 |
| 8 | 50 | — | 50 | — | 0 |
| 9 | 10 | — | 90 | — | 0 |
| 10 | — | 99 | — | 1 | 0 |
| 11 | — | 98 | — | 2 | 0 |
| 12 | — | 95 | — | 5 | 0 |
| 13 | — | 90 | — | 10 | 0 |
| 14 | — | 80 | — | 20 | 0 |
| 15 | — | 70 | — | 30 | 0 |
| 16 | — | 70 | — | 30 | 25 |
| 17 | — | 50 | — | 50 | 0 |
| 18 | — | 10 | — | 90 | 0 |
| 19 | 100 | — | — | — | 0 |
| 20 | — | — | 100 | — | 0 |
| 21 | — | 100 | — | — | 0 |
| 22 | — | — | — | 100 | 0 |

*1 The ratio of compound 1 to the total amount of compound 1 and compound 2.
*2 The ratio of compound 2 to the total amount of compound 1 and compound 2.
*3 The ratio of fluorinated oil to the total amount of compound 1, compound 2 and fluorinated oil.

Ex. 23

Using the composition 1, by dry coating (vacuum deposition method), surface treatment on a substrate was conducted to obtain a surface layer-provided substrate 21. As the substrate, chemically tempered glass (Dragontrail, tradename, manufactured by AGC Inc., 50 mm×50 mm, thickness: 0.5 mm) was used.

Vacuum deposition was conducted by using a vacuum deposition apparatus (manufactured by SHOWA SHINKU CO., LTD., SGC-22WA). 35 mg of the compound 1 was filled in a molybdenum boat in the vacuum deposition apparatus, and inside of the vacuum deposition apparatus was evacuated of air to a level of at most $5\times10^{-3}$ Pa. The boat on which the composition 1 was placed was heated to deposit the composition 1 on the surface of the substrate to form a surface film on the surface of the substrate. The substrate having the surface film formed thereon was left to stand at a temperature of 25° C. under a humidity of 40% RH overnight to obtain a surface layer-provided substrate 21 having a surface layer on the surface of the substrate. The thickness of the surface layer was 10 nm. Ex. 23 is an Example of the present invention.

Ex. 24 to 44

Surface layer-provided substrates were obtained in the same manner as in Ex. 23 except that the compositions 2 to 22 were used instead of the composition 1. The thickness of the surface layer was 10 nm in each Ex. Ex. 24 to 40 are Examples of the present invention, and Ex. 41 to 44 are Comparative Examples.

[Evaluation]

With respect to the surface layer of each of the surface layer-provided substrates obtained in Ex. 23 to 44, in accordance with the following method, the initial water contact angle, the water contact angle after the abrasion test, and the water contact angle after the weather resistance test were measured and evaluated. In the following evaluation, the surface of the surface layer means the surface on the atmosphere side of the surface layer. The results are shown in Table 2.

(Water Contact Angle Measurement Method)

Measured with respect to about 2 μL of distilled water placed on the surface of the surface layer, by using a contact angle measuring apparatus DM-500 (manufactured by Kyowa Interface Science Co., Ltd.). Measurements were conducted at five different points on the surface of the surface layer, and the average value was calculated. For the calculation of the contact angle, a 2θ method was employed.

<Initial Water Contact Angle>

With respect to the surface layer, the initial water contact angle was measured by the above-described measuring method.

<Water Contact Angle after Weather Resistance Test>

In accordance with JIS Z2381:2001, atmospheric exposure testing (weather resistance test) was conducted. That is, an evaluation sample was exposed to the atmosphere so that the surface layer faced toward the south at an angle of 30° to the horizontal direction for three months. With respect to the surface of the surface layer after the weather resistance test, the water contact angle was measured by the above-described method.

Further, the change of the water contact angle by the weather resistance test was calculated. The change of the water contact angle by the weather resistance test is obtained by (the initial water contact angle)–(the water contact angle after the weather resistance test).

<Water Contact Angle after Abrasion Resistance Test>

With respect to the surface layer, in accordance with JIS L0849: 2013 (ISO 105-X12: 2001), using a reciprocating traverse testing machine (manufactured by KNT Co.), steel wool Bon Star (#0000, dimensions: 5 mm×10 mm×10 mm) was reciprocated 5,000 times under a pressure of 98.07 kPa at a speed of 320 cm/min to conduct abrasion test. With respect to the surface of the surface layer after the abrasion test, the water contact angle was measured by the above-described method.

Further, the change of the water contact angle by the abrasion resistance test was calculated. The change of the water contact angle by the abrasion resistance test is obtained by (the initial water contact angle)–(the water contact angle after the abrasion resistance test).

The initial water contact angle thus measured is preferably at least 95°. The change of the water contact angle by the weather resistance test is preferably at most 15°. Further, the change of the water contact angle by the abrasion resistance test is preferably at most 13°. The measurement results are shown in Table 2.

Further, the initial water contact angle of the surface layer and the water contact angle after the abrasion resistance test are particularly preferably at least 100°. The water contact angle of the surface layer is preferably as high as possible, and the upper limit value is not particularly limited.

TABLE 2

| | | Water contact angle (°) | | | | |
|---|---|---|---|---|---|---|
| Ex. | Composition | Initial | After weather resistance test | Change of water contact angle by weather resistance test | After abrasion resistance test | Change of water contact angle by abrasion resistance test |
| 23 | 1 | 114 | 96 | 18 | 98 | 16 |
| 24 | 2 | 114 | 97 | 17 | 99 | 15 |
| 25 | 3 | 113 | 99 | 14 | 100 | 13 |
| 26 | 4 | 112 | 012 | 10 | 101 | 11 |
| 27 | 5 | 110 | 104 | 6 | 100 | 10 |
| 28 | 6 | 108 | 104 | 4 | 97 | 11 |
| 29 | 7 | 107 | 103 | 4 | 97 | 10 |
| 30 | 8 | 106 | 102 | 4 | 93 | 13 |
| 31 | 9 | 100 | 97 | 3 | 85 | 15 |
| 32 | 10 | 112 | 90 | 22 | 95 | 17 |
| 33 | 11 | 112 | 91 | 21 | 97 | 15 |
| 34 | 12 | 109 | 92 | 17 | 98 | 11 |
| 35 | 13 | 107 | 93 | 14 | 98 | 9 |
| 36 | 14 | 105 | 94 | 11 | 98 | 7 |
| 37 | 15 | 103 | 94 | 9 | 95 | 8 |
| 38 | 16 | 102 | 93 | 9 | 95 | 7 |
| 39 | 17 | 98 | 91 | 7 | 89 | 9 |
| 40 | 18 | 93 | 86 | 7 | 82 | 11 |
| 41 | 19 | 114 | 94 | 20 | 97 | 17 |
| 42 | 20 | 98 | 96 | 2 | 82 | 16 |
| 43 | 21 | 113 | 90 | 23 | 94 | 19 |
| 44 | 22 | 91 | 85 | 6 | 78 | 13 |

INDUSTRIAL APPLICABILITY

The present composition is useful for various applications for which it is required to impart lubricity and water/oil repellency. For example, it is used preferably for an article for a transport, an article for precision equipment, an article for optical equipment, article for building, and an article for electronic equipment.

As specific examples of the article for transport, an exterior member, an interior member, glass (for example, windshield, side glass and rear glass), a mirror and a tire wheel of a train, an automobile, shipping, an aircraft, etc. may be mentioned. As specific examples of the article for precision equipment, a window material of a camera may be mentioned. As specific examples of the article for optical equipment, a lens may be mentioned. As specific examples of the article for building, a window, a floor material, a wall material and a door material may be mentioned. As specific examples of the article for electronic equipment, a display glass, a display protective film, an antireflection film, a fingerprint sensor and a touch panel of a communication terminal or an image display device may be mentioned.

As more specific examples of the present composition, a display input device such as a touch panel, surface protective coating on a transparent glass or transparent plastic member, kitchen antifouling coating, water repellent moistureproof coating or antifouling coating on electronic device, a heat exchanger or a battery, toiletry antifouling coating, coating on a member which requires liquid repellency while conducting electricity, water repellent/waterproof/water sliding coating on a heat exchanger, and a surface low friction coating on the inside of a vibrating strainer or a cylinder, may, for example, be mentioned.

Further, a front protective plate, an antireflection plate, a polarizing plate, an antiglare plate or a surface thereof having an antireflection film, of a display, an apparatus having a display input device of which the screen is operated by human fingers or hands, such as a touch panel sheet or a touch panel display of an apparatus such as a mobile phone or a personal digital assistant, a decorative building material for restroom, bathroom, lavatory, kitchen and the like, waterproof coating for a wiring board, water repellent/waterproof coating on a heat exchanger, water repellent coating on a solar cell, waterproof/water repellent coating on a printed wiring board, waterproof/water repellent coating for an electronic equipment casing or an electronic member, insulating property-improving coating on a power transmission line, waterproof/water repellent coating on a filter, waterproof coating on an electromagnetic wave absorption material or a sound-absorbing material, antifouling coating for bathroom, kitchen instrument and toiletry, water repellent/waterproof/water sliding coating on a heat exchanger, surface low-friction coating on the inside of a vibrating strainer or a cylinder, and surface protective coating on a machine component, a vacuum apparatus component, a bearing component, an automobile component, an industrial tool, etc. may, for example, be mentioned.

The present composition, which has the above properties, exhibits remarkable effects particularly when used for a touch panel having the surface layer on the surface of a member constituting a plane to be touched with fingers.

This application is a continuation of PCT Application No. PCT/JP2020/004643, filed on Feb. 6, 2020, which is based upon and claims the benefit of priority from Japanese Patent Application No. 2019-023333 filed on Feb. 13, 2019. The contents of those applications are incorporated herein by reference in their entireties.

What is claimed is:

1. A fluorinated ether composition, comprising:
a compound (1) of formula (1); and
a compound (2) of formula (2);
wherein an amount of compound (2) is from 5.0 to 50.0 mol % relative to the total amount of the compound (1) and the compound (2),
wherein the formula (1) is

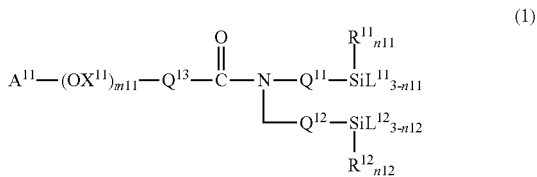

(1)

where $A^{11}$ is a perfluoroalkyl group, $X^{11}$ is a fluoroalkylene group having at least one fluorine atom, m11 is an integer of from 5 to 200, $Q^{11}$ and $Q^{12}$ are each independently a bivalent linking group, $R^{11}$ and $R^{12}$ are each independently a monovalent hydrocarbon group, $L^{11}$ and $L^{12}$ are each independently a hydrolyzable group or a hydroxy group, n11 and n12 are each independently an integer of from 0 to 2, and $Q^{13}$ is a single bond or a bivalent linking group, with a proviso that when $(OX^{11})_{m11}$ has $(OCF_2)$ and $(OCF_2CF_2)$, the proportion of $(OCF_2CF_2)$ to $(OCF_2)$ is from 0.1 to 1.5, and the formula (2) is

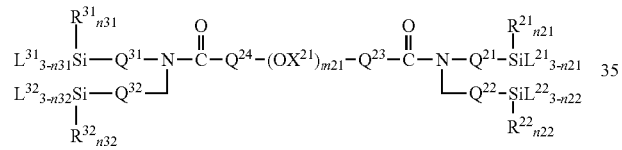

(2)

where $X^{21}$ is a fluoroalkylene group having at least one fluorine atom, m21 is an integer of from 2 to 200, $Q^{21}$, $Q^{22}$, $Q^{31}$, $Q^{32}$ and $Q^{24}$ are each independently a bivalent linking group, $R^{21}$, $R^{22}$, $R^{31}$ and $R^{32}$ are each independently a monovalent hydrocarbon group, $L^{21}$, $L^{22}$, $L^{31}$ and $L^{32}$ are each independently a hydrolyzable group or a hydroxy group, n21, n22, n31 and n32 are each independently an integer of from 0 to 2, and $Q^{23}$ is a single bond or a bivalent linking group.

2. The fluorinated ether composition according to claim 1, wherein $X^{11}$ is a $C_{1-6}$ perfluoroalkylene group, and $Q^{13}$ is a single bond.

3. The fluorinated ether composition according to claim 1, wherein $-Si(R^{11})_{n11}L^{11}_{3-n11}$ and $-Si(R^{12})_{n12}L^{12}_{3-n12}$ are the same group.

4. The fluorinated ether composition according to claim 1, wherein $X^{21}$ is a $C_{1-6}$ perfluoroalkylene group, $Q^{23}$ is a single bond, and $Q^{24}$ is a $C_{1-6}$ perfluoroalkylene group.

5. The fluorinated ether composition according to claim 1, wherein $-Si(R^{21})_{n21}L^{2}_{3-n21}$, $-Si(R^{22})_{n22}L^{22}_{3-n22}$, $-Si(R^{31})_{n31}L^{3}_{3-n31}$ and $-Si(R^{32})_{n32}L^{3}_{3-n32}$ are the same group.

6. The fluorinated ether composition according to claim 1, further comprising:
a fluorinated oil.

7. The fluorinated ether composition according to claim 6, wherein the fluorinated oil is a perfluoropolyether oil.

8. The fluorinated ether composition according to claim 6, wherein the fluorinated oil is in an amount of from 0.1 to 50 mass % to the total amount of the compound (1), the compound (2) and the fluorinated oil.

9. A coating liquid, comprising:
the fluorinated ether composition of claim 1; and
a liquid medium.

10. An article, comprising:
a substrate; and
a surface layer comprising the fluorinated ether composition of claim 1 on the surface of the substrate.

11. The article according to claim 10, wherein the surface layer is formed on a surface of a member constituting a plane of a touch panel configured to be touched by a finger.

12. A method for producing an article, comprising:
treating a surface of a substrate by dry coating method using the fluorinated ether composition of claim 1 such that a surface layer comprising the fluorinated ether composition is formed on the surface of the substrate.

13. A method for producing an article, comprising:
applying the coating liquid of claim 9 to a surface of a substrate by wet coating method, followed by drying such that a surface layer comprising the fluorinated ether composition is formed on the surface of the substrate.

14. The fluorinated ether composition according to claim 1, wherein a number average molecular weight of compound (1) is from 4540 to 20,000, and a number average molecular weight of compound (2) is from 4490 to 20,000.

* * * * *